US 9,433,890 B2

(12) United States Patent
Inui et al.

(10) Patent No.: US 9,433,890 B2
(45) Date of Patent: Sep. 6, 2016

(54) DEHYDRATION EQUIPMENT, GAS COMPRESSION SYSTEM, AND DEHYDRATION METHOD

(71) Applicant: MITSUBISHI HEAVY INDUSTRIES, LTD., Tokyo (JP)

(72) Inventors: Masayuki Inui, New York, NY (US); Takahito Yonekawa, New York, NY (US); Koji Nakayama, New York, NY (US); Tatsuya Tsujiuchi, New York, NY (US); Yoshiki Sorimachi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 492 days.

(21) Appl. No.: 13/859,339

(22) Filed: Apr. 9, 2013

(65) Prior Publication Data
US 2014/0190349 A1 Jul. 10, 2014

Related U.S. Application Data

(63) Continuation-in-part of application No. 13/738,611, filed on Jan. 10, 2013, now abandoned.

(51) Int. Cl.
*B01D 53/26* (2006.01)

(52) U.S. Cl.
CPC .......... *B01D 53/261* (2013.01); *B01D 53/265* (2013.01); *B01D 2259/402* (2013.01)

(58) Field of Classification Search
None
See application file for complete search history.

(56) References Cited

U.S. PATENT DOCUMENTS

| 5,968,234 | A | * | 10/1999 | Midgett et al. ............... 95/120 |
| 8,303,695 | B2 | * | 11/2012 | Mazumdar et al. ........... 96/109 |
| 2005/0229784 | A1 | | 10/2005 | Thomas et al. |
| 2012/0014861 | A1 | | 1/2012 | Hirata et al. |
| 2013/0000486 | A1 | | 1/2013 | Guenther |
| 2013/0312427 | A1 | * | 11/2013 | Hashi et al. ..................... 62/6 |

FOREIGN PATENT DOCUMENTS

| JP | 63-20936 U | 2/1988 |
| JP | 2010-241630 A | 10/2010 |

OTHER PUBLICATIONS

Search report of WO2014109329, Jul. 17, 2015 Accessed Jul. 21, 2015.*

(Continued)

*Primary Examiner* — Duane Smith
*Assistant Examiner* — Phillip Shao
(74) *Attorney, Agent, or Firm* — Westerman, Hattori, Daniels & Adrian, LLP (57) ABSTRACT

In a dehydration equipment, a regenerative gas heater heats a portion of $CO_2$ gas dehydrated in an adsorption tower that is performing an adsorption process and supplies the gas to an adsorption tower that is performing a regeneration process. A regenerative gas preheater performs heat exchange between the $CO_2$ gas that will be supplied to a regenerative gas heater and the $CO_2$ gas sent out from the adsorption tower that is performing the regeneration process. Then, in the dehydration equipment, a regenerative gas cooler cools the $CO_2$ gas that has been sent out from the adsorption tower that is performing the regeneration process and exchanged heat, separates water from the cooled $CO_2$ gas, and returns the resulting gas to the adsorption tower. Thus, the dehydration equipment can prevent an increase in utility consumption due to the regeneration process.

7 Claims, 3 Drawing Sheets

(56) References Cited

OTHER PUBLICATIONS

International Search Report dated Apr. 15, 2014, issued in Corresponding Application No. PCT/JP2014/050134, with Partial English Translation (3 pages).

Written Opinion dated Apr. 15, 2014, issued in Corresponding Application No. PCT/JP2014/050134, with English Translation (10 pages).

Australian Office Action dated Dec. 7, 2015, issued in counterpart Australian Patent Application No. 2014205989. (3 pages).

* cited by examiner

DEHYDRATION EQUIPMENT, GAS COMPRESSION SYSTEM, AND DEHYDRATION METHOD

TECHNICAL FIELD

The present invention relates to a dehydration equipment, a gas compression system, and a dehydration method.

BACKGROUND ART

Conventionally, industrial facilities have gas compression systems (for example, Patent Literature 1) that compress a predetermined gas, such as $CO_2$ gas, recovered from exhaust gas discharged from industrial equipment, such as boilers and gas turbines.

Figure 3:
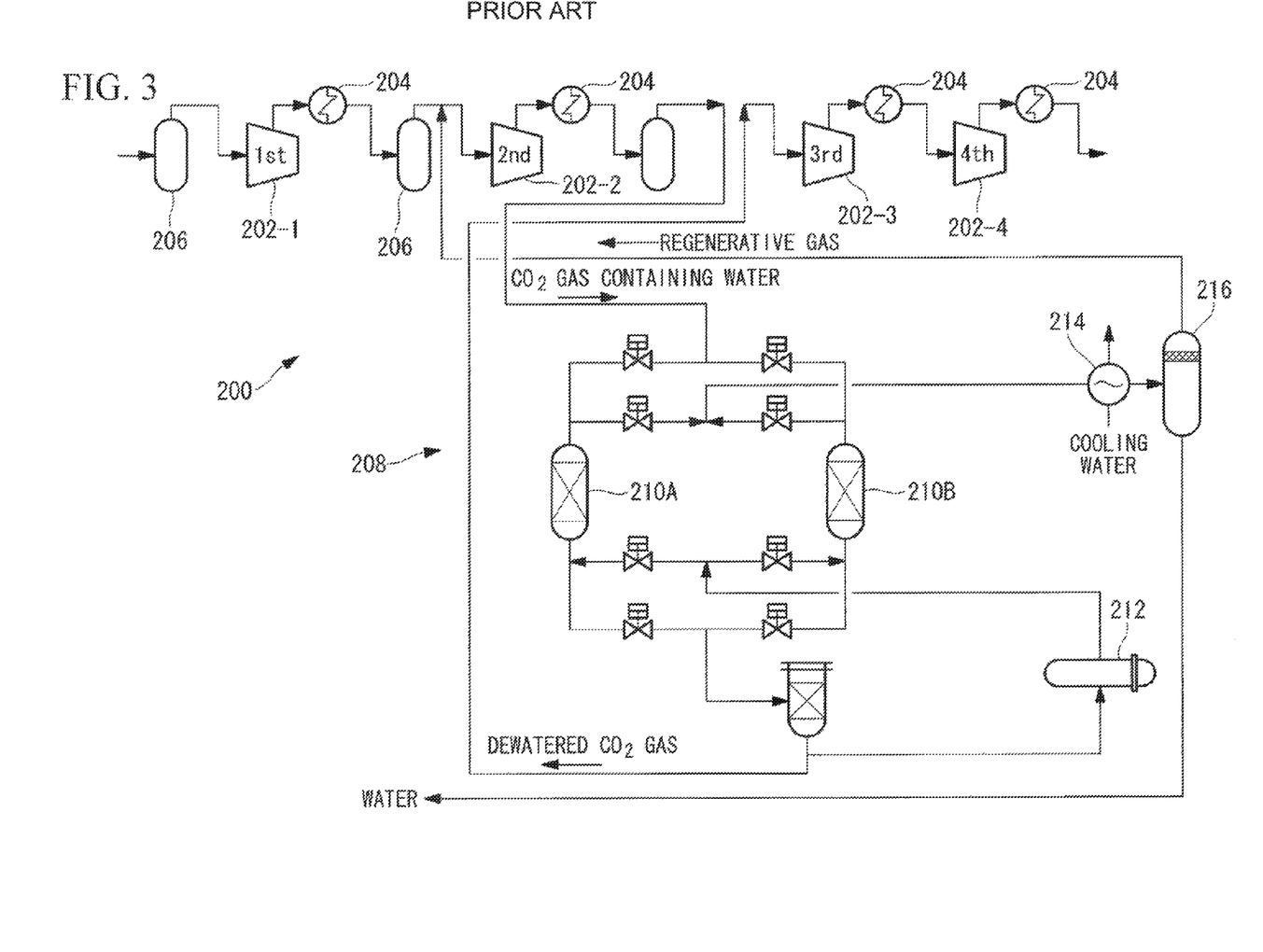
FIG. 3 shows the configuration of a conventional dehydration equipment.

FIG. 3 shows an example of the configuration of a conventional gas compression system 200. The gas compression system 200 shown in FIG. 3 compresses $CO_2$ gas, for example.

The gas compression system 200 compresses $CO_2$ gas with a plurality of compressors 202 (202-1 to 202-4). In addition to the plurality of compressors 202, the gas compression system 200 includes a plurality of coolers 204, a plurality of knock-out drums (gas-liquid separating devices) 206, and a dehydration equipment 208.

The coolers 204 cool the compressed $CO_2$ gas. The knock-out drums 206 recover water ($H_2O$) condensed due to a decrease in the degree of water saturation in the $CO_2$ gas by compression. The dehydration equipment 208 uses a adsorbent to recover (remove) water that cannot be recovered by the knock-out drums 206. In the example in FIG. 3, the dehydration equipment 208 is provided in the middle of the plurality of compressors 202.

The dehydration equipment 208 includes adsorption towers 210 (210A and 210B), a regenerative gas heater 212, a regenerative gas cooler 214, and regenerative gas knock-out drum 216.

The adsorption towers 210 alternately perform an adsorption process, in which water contained in $CO_2$ gas is adsorbed, and a regeneration process, in which the adsorbed water is desorbed. After completion of the regeneration process, the adsorption towers 210 perform a cooling process and a stand-by process before proceeding to the adsorption process.

For example, when the adsorption tower 210B performs the regeneration process, a portion of $CO_2$ gas dehydrated in the adsorption tower 210A is heated to a predetermined temperature by the regenerative gas heater 212 and is supplied to the adsorption tower 210B. Thus, water is desorbed from the adsorption tower 210B.

The regenerative gas sent out from the adsorption tower 210B and containing the desorbed water is supplied to the regenerative gas cooler 214 and is cooled to a predetermined temperature. At this time, most of the desorbed water is recovered as condensed water by the regenerative gas knock-out drum 216 in the subsequent stage.

Because the water-saturated regenerative gas resulting after recovery of water by the regenerative gas knock-out drum 216 has been reduced in pressure by passing through pipes and devices, the regenerative gas is returned not to the inlet side of the compressor 202-3, which is provided in the subsequent stage of the compressor 202-2 that supplies $CO_2$ gas to the dehydration equipment 208, but to the upstream side, such as to the inlet of the compressor 202-2.

CITATION LIST

Patent Literature

{PTL 1}
Japanese Unexamined Patent Application, Publication No. 2010-241630

SUMMARY OF INVENTION

Technical Problem

In the above-described conventional dehydration equipment 208, the regenerative gas supplied to the adsorption tower 210B performing the regeneration process needs to be constantly heated with a predetermined amount of heat. Thus, in the conventional dehydration equipment 208, the driving demand for the regenerative gas heater 212 is high, and a large amount of steam or electric power is consumed to heat the regenerative gas.

Furthermore, in the conventional dehydration equipment 208, the regenerative gas containing residual heat and sent out from the adsorption tower 210 performing the regeneration process needs to be constantly cooled by a predetermined amount of cooling water while the regeneration process is performed. Thus, in the conventional dehydration equipment 208, the driving demand for the regenerative gas cooler 214 is high, and a large amount of the cooling water is consumed.

Furthermore, because the regenerative gas used in the regeneration process has been reduced in pressure while being used in the regeneration process, the regenerative gas cannot be returned to the inlet of the compressor 202-3, which is provided in the subsequent stage of the compressor 202-2 that supplies $CO_2$ gas to the dehydration equipment 208, and the regenerative gas is returned to the upstream side, such as to the inlet of the compressor 202-2. As a result, in the compressor 202 on the upstream side, to which the regenerative gas is returned, the flow rate of the $CO_2$ gas supplied thereto is increased by the flow rate of the regenerative gas, leading to an increase in motive power required by the compressor 202 on the upstream side, that is, an increase in utility consumption (power consumption and steam consumption).

Moreover, because the supply of the regenerative gas is stopped in the stand-by process subsequent to the regeneration process, the operating conditions of the compressor 202 on the upstream side, to which the regenerative gas is returned, are changed. More specifically, for example, if the compressor 202-2 is designed on the basis of an assumption that the regenerative gas is returned thereto, the compressor 202-2 is not operated under optimum operating conditions during the stand-by process in which the regenerative gas is not returned thereto. Thus, the design conditions of the dehydration equipment 208 set in the design phase of the gas compression system 200 have an influence on the design of the compressor 202 on the upstream side, to which the regenerative gas is returned.

The present invention has been made in view of these circumstances, and an object thereof is to provide a dehydration equipment, a gas compression system, and a dehydration method that prevent an increase in utility consumption due to the regeneration process.

Solution to Problem

To overcome the above-described problems, the dehydration equipment, gas compression system, and dehydration method of the present invention employ the following solutions.

A dehydration equipment according to a first aspect of the present invention includes a plurality of adsorption towers that alternately perform an adsorption process, in which water contained in gas is adsorbed, and a regeneration process, in which the adsorbed water is desorbed, are provided in parallel in a gas supply line and a predetermined adsorption tower performs the adsorption process while the other adsorption tower performs the regeneration process; a heating unit that heats a portion of the gas dehydrated in the adsorption tower that is performing the adsorption process and supplies the gas to the adsorption tower that is performing the regeneration process; a cooling unit that cools the gas sent out from the adsorption tower that is performing the regeneration process; a gas-liquid separating unit that separates condensed water from the gas cooled by the cooling unit and returns the resulting gas after separating water therefrom to the adsorption tower; and a preheating unit that performs heat exchange between the gas that has been sent out from the adsorption tower that is performing the regeneration process and will be supplied to the cooling unit and the gas that will be supplied to the heating unit.

The dehydration equipment of this configuration includes a plurality of adsorption towers that are provided in parallel in a gas supply line and alternately perform an adsorption process, in which water contained in gas is adsorbed, and a regeneration process, in which the adsorbed water is desorbed, a predetermined adsorption tower performing the adsorption process while the other adsorption tower performs the regeneration process. The water contained in the gas is adsorbed by a adsorbent provided in the adsorption tower. In the regeneration process, the adsorbent desorbs the adsorbed water by heating.

In the dehydration equipment, the heating unit heats a portion of the gas dehydrated in the adsorption tower that is performing the adsorption process and supplies the gas to the adsorption tower that is performing the regeneration process, and the preheating unit performs heat exchange between the gas that will be supplied to the heating unit and the gas sent out from the adsorption tower that is performing the regeneration process. Then, in the dehydration equipment, the cooling unit cools the gas sent out from the adsorption tower that is performing the regeneration process and exchanged heat in the preheating unit, and the gas-liquid separating unit separates condensed water from the gas cooled by the cooling unit and returns the resulting gas after separating water therefrom to the adsorption tower.

With the preheating unit, the temperature of the gas supplied to the cooling unit is decreased compared with that in the case without the preheating unit. Accordingly, the energy consumption by the cooling unit, i.e., the consumption of the cooling water supplied to the cooling unit, is reduced. On the other hand, the temperature of the gas to be supplied to the heating unit is increased compared with that in the case without the preheating unit. Thus, the energy consumed by the heating unit for heating the gas is reduced.

Accordingly, the dehydration equipment of this configuration can prevent an increase in utility consumption due to the regeneration process.

In the first aspect, it is desirable that the heating unit control the degree of heating of the gas according to the amount of heat exchange performed by the preheating unit.

In the first aspect, in the regeneration process, when the heated gas is supplied to the adsorption tower, the adsorbent is gradually heated starting from a gas supply side, desorbing water. The desorbed water and the gas move toward a gas sending-out side and are again adsorbed by the adsorbent on the sending-out side. That is, in the regeneration process, by alternately performing desorption and adsorption of water, water is desorbed starting from the adsorbent on the gas supply side to the adsorbent on the sending-out side. Hence, the heated gas gives a larger amount of energy to the adsorbent immediately after the start of the regeneration process. Although the temperature of the gas sent out from the adsorption tower that is performing the regeneration process is initially low, it increases with time. Thus, the amount of heat exchange performed by the preheating unit changes with time.

With this configuration, because the degree of heating of the gas by the heating unit is controlled according to the amount of heat exchange performed by the preheating unit, the energy consumed by the heating unit for heating the gas can be more effectively reduced.

In the first aspect, it is desirable that the dehydration equipment further include a compressor that is provided between the gas-liquid separating unit and the adsorption tower and pressurizes the gas used in the regeneration process so as to compensate for pressure loss caused in the regeneration process.

With this configuration, the gas is pressurized by the compressor to a pressure equal to the pressure of the gas supplied to the dehydration equipment, is mixed with the gas supplied to the dehydration equipment, and is supplied to the adsorption tower. Thus, all of the gas sent out from the dehydration equipment can be returned to the gas supply source. With this configuration, the gas used in the regeneration process is not returned to the inlet of the compressor that has supplied the gas, as in the case of the conventional apparatus, and thus, it is possible to solve the problem of increased motive power required by the compressor to which the gas is returned.

In the first aspect, it is desirable that the preheating unit include a plurality of preheating units.

With this configuration, by providing a plurality of preheating units arranged in series, for example, the efficiency of the heat exchange between the gas that has been sent out from the adsorption tower that is performing the regeneration process and will be supplied to the cooling unit and the gas that will be supplied to the heating unit can be improved.

A gas compression system according to a second aspect of the present invention includes a plurality of compressors that compress gas, and the dehydration equipment according to the first aspect. The gas compressed by a predetermined compressor is dehydrated by the dehydration equipment, and the dehydrated gas is further compressed by the compressor provided in the subsequent stage of the predetermined compressor.

A dehydration method according to a third aspect of the present invention includes providing a plurality of adsorption towers that alternately perform an adsorption process, in which water contained in gas is adsorbed, and a regeneration process, in which the adsorbed water is desorbed, are provided in parallel in a gas supply line and a predetermined adsorption tower performs the adsorption process while the other adsorption tower performs the regeneration process; heating a portion of the gas dehydrated in the adsorption tower that is performing the adsorption process with a heating unit and supplying the gas to the adsorption tower that is performing the regeneration process; performing heat exchange between the gas that will be supplied to the heating unit and the gas sent out from the adsorption tower that is performing the regeneration process with a preheating unit; cooling the gas sent out from the adsorption tower that is performing the regeneration process and exchanged heat in the preheating unit with a cooling unit; and separating condensed water from the gas cooled by the cooling unit and returning the resulting gas after separating water therefrom to the adsorption tower with a gas-liquid separating unit.

Advantageous Effects of Invention

The present invention provides an advantage in that an increase in utility consumption due to the regeneration process is prevented.

DESCRIPTION OF EMBODIMENTS

A dehydration equipment, gas compression system, and dehydration method according to an embodiment of the present invention will be described below with reference to the drawings.

Figure 1:
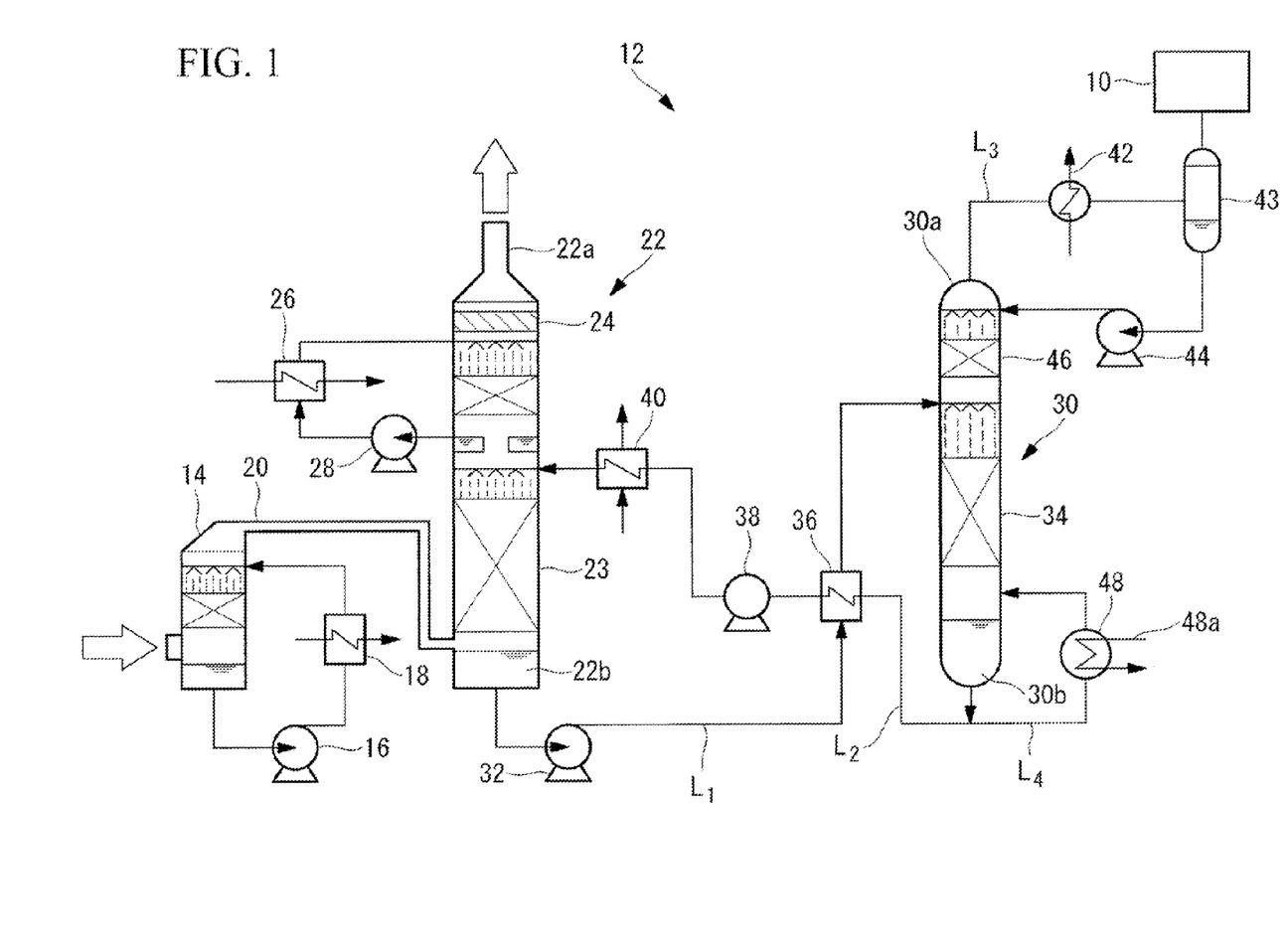
FIG. 1 shows the configuration of a $CO_2$ recovery apparatus according to an embodiment of the present invention.

FIG. 1 is a $CO_2$ recovery apparatus 12 having a $CO_2$ compression system 10 according to this embodiment.

The $CO_2$ recovery apparatus 12 includes a cooling tower 14.

Exhaust gas containing $CO_2$ discharged from industrial equipment, such as a boiler or a gas turbine, is supplied to the cooling tower 14 by a blower (not shown). The exhaust gas supplied to the cooling tower 14 is cooled by cooling water. The cooling water used to cool the exhaust gas is made to pass through a cooling device 18 by a pump 16, is supplied again to the cooling tower 14, and is sprayed in the cooling tower 14.

The cooled exhaust gas containing $CO_2$ is supplied to an absorption tower 22 from the bottom thereof through an exhaust gas line 20. In the absorption tower 22, $CO_2$ absorbent mainly composed of, for example, alkanolamine (amine solution) is brought into counterflow contact with the exhaust gas while passing through a packing 23. As a result, $CO_2$ in the exhaust gas is absorbed by the $CO_2$ absorbent, and $CO_2$ is removed from the exhaust gas discharged from the industrial equipment. Purified gas obtained by removing $CO_2$ is discharged from a tower top 22a of the absorption tower 22.

The purified gas contains steam. The steam is condensed by a contact with cooled water which is sprayed at the upper portion of the absorption tower 22. The condensed water is circulated by a pump 28 between the cooling device 26 and the absorption tower 22 outside the absorption tower 22 and cooled by the cooling device 26. Furthermore, a mist eliminator 24 is provided above the spray at the upper portion of the absorption tower 22 and a mist carry over is separated and removed from the purified gas.

The $CO_2$ absorbent that has absorbed $CO_2$ in the absorption tower 22 is reserved in a tower bottom 22b, is supplied to a regeneration tower 30 through a liquid-feed line $L_1$ connecting the tower bottom 22b of the absorption tower 22 and the upper portion of the regeneration tower 30 by a pump 32, and is sprayed onto a packing 34 in the regeneration tower 30. Furthermore, a liquid-feed line $L_2$ is provided between the absorption tower 22 and the regeneration tower 30 to connect a tower bottom 30b of the regeneration tower 30 and the upper portion of the absorption tower 22.

Furthermore, a heat exchanger 36 that performs heat exchange between rich solution ($CO_2$ absorbent that has absorbed $CO_2$) and lean solution ($CO_2$ absorbent from which $CO_2$ has been removed) is provided at an intersection of the liquid-feed line $L_1$ and the liquid-feed line $L_2$. The heat exchanger 36 heats the rich solution and cools the lean solution.

The $CO_2$ absorbent that has absorbed $CO_2$ (rich solution) releases $CO_2$ by an endothermic reaction caused by counterflow contact while passing through the packing 34 in the regeneration tower 30. Most of the $CO_2$ in the rich solution is removed by the time the rich solution reaches the tower bottom 30b of the regeneration tower 30, and the rich solution is regenerated in the form of lean solution. The regenerated lean solution is supplied to the absorption tower 22 again by the pump 38, via a water-cooled cooling device 40, to be reused as the $CO_2$ absorbent.

The lean solution regenerated in the regeneration tower 30 by releasing $CO_2$ is directed back to the absorption tower 22 through the liquid-feed line $L_2$ by the pump 38. The lean solution, while being directed back to the absorption tower 22, is cooled in the heat exchanger 36 by heat exchange with the absorbent supplied from the absorption tower 22 to the regeneration tower 30 and is then further cooled by the water-cooled cooling device 40 to a temperature suitable for absorbing $CO_2$.

A $CO_2$ discharge line $L_3$ is connected to a tower top 30a of the regeneration tower 30. The $CO_2$ gas discharged from the regeneration tower 30 through the $CO_2$ discharge line $L_3$ is cooled by a cooling device 42 using cooling water and is supplied to a reflux drum 43. The $CO_2$ gas supplied to the reflux drum 43 is separated from water. The $CO_2$ gas separated from water is supplied to the $CO_2$ compression system 10.

The condensed water separated in the reflux drum 43 is directed back to the upper portion of the regeneration tower 30 by a pump 44. The condensed water directed back to the regeneration tower 30 cools a condensing unit 46 to prevent the $CO_2$ absorbent from being released.

Furthermore, a portion of the $CO_2$ absorbent reserved in the tower bottom 30b of the regeneration tower 30 is supplied to a reboiler 48 through a circulation path $L_4$, is heated by heat exchange with high-temperature steam flowing through a steam pipe 48a, and is directed back to the regeneration tower 30. By being heated in this manner, the $CO_2$ absorbent in the tower bottom 30b releases $CO_2$, and furthermore, the $CO_2$ absorbent releases $CO_2$ at the contact interface between gas and liquid on the indirectly heated packing 34.

Figure 2:
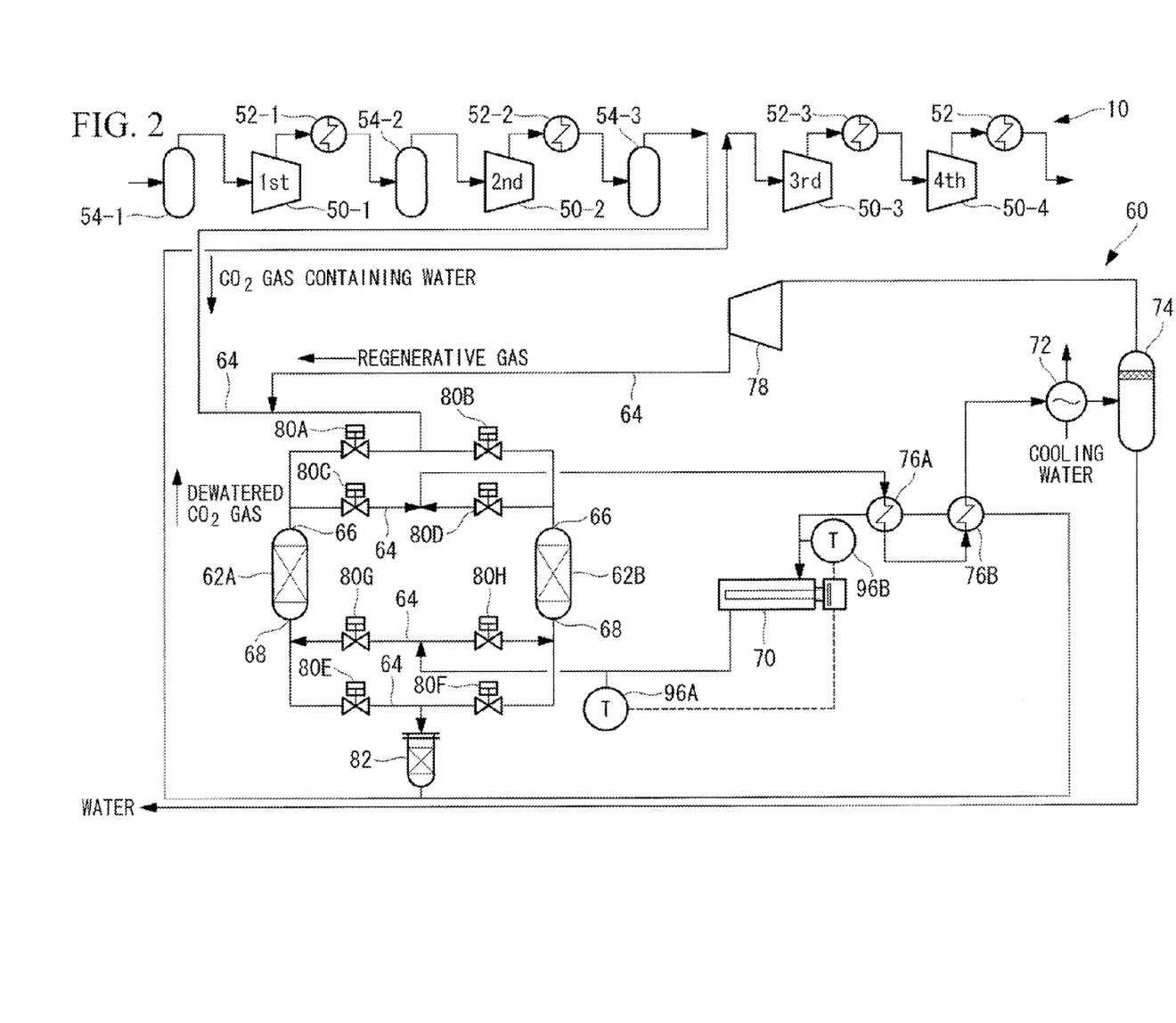
FIG. 2 shows the configuration of a dehydration equipment according to the embodiment of the present invention.

FIG. 2 shows the configuration of the $CO_2$ compression system 10 according to this embodiment.

The $CO_2$ compression system 10 includes a plurality of compressors 50 that compress the $CO_2$ gas. The plurality of compressors 50 are connected in series.

The $CO_2$ compression system 10 also includes coolers 52 and knock-out drums 54 between the compressors 50. The knock-out drums 54 recover condensed water from the $CO_2$ gas, and the coolers 52 cool the $CO_2$ gas heated by compression by the compressors 50. The knock-out drums 54 recover water condensed due to a decrease in the degree of water saturation in the $CO_2$ gas by the compression.

Moreover, the $CO_2$ compression system 10 includes a dehydration equipment 60 for removing water from the $CO_2$ gas. The dehydration equipment 60 uses a adsorbent to recover (remove) water that is contained in the $CO_2$ gas and cannot be recovered by the knock-out drums 54.

In the $CO_2$ compression system 10 according to this embodiment, for example, four compressors 50 (50-1, 50-2, 50-3, 50-4), four coolers 52 (52-1, 52-2, 52-3, 52), three knock-out drums 54 (54-1, 54-2, 54-3), and one dehydration equipment 60 are connected in series. More specifically, the knock-out drum 54-1 is provided upstream of the compressor 50-1; the cooler 52-1 and the knock-out drum 54-2 are provided between the compressor 50-1 and the compressor 50-2; the cooler 52-2, the knock-out drum 54-3, and the dehydration equipment 60 are provided between the compressor 50-2 and the compressor 50-3; the cooler 52-3 is provided between the compressor 50-3 and the compressor 50-4; and the cooler 52 is provided downstream of the compressor 50-4.

Note that the above number and installation order of the compressors 50, the coolers 52, the knock-out drums 54, and the dehydration equipment 60 are just an example, and the number and installation order may be changed, so long as $CO_2$ gas can be compressed and dehydrated.

The dehydration equipment 60 includes a plurality of (in this embodiment, two) adsorption towers 62 (62A, 62B) that are provided in parallel in a $CO_2$ gas supply line 64 and alternately perform the adsorption process, in which water contained in $CO_2$ gas is adsorbed, and the regeneration process, in which the adsorbed water is desorbed. In the dehydration equipment 60, while a predetermined adsorption tower 62 is performing the adsorption process, the other adsorption tower 62 is performing the regeneration process. After completion of the regeneration process, the adsorption towers 62 perform a stand-by process before proceeding to the adsorption process.

In the adsorption process, while $CO_2$ gas at a temperature in the range from, for example, 20° C. to 40° C. is supplied from an opening 66 in the adsorption tower 62 and is sent out from an opening 68, a adsorbent adsorbs water contained in the $CO_2$ gas, thereby dehydrating the $CO_2$ gas.

In the regeneration process, while heated $CO_2$ gas is supplied from the opening 68 in the adsorption tower 62 and is sent out from the opening 66, the adsorbent desorbs the adsorbed water by heating, thereby sending out the desorbed water together with the heated $CO_2$ gas.

For example, the adsorption process is performed for eight hours, the regeneration process is performed for four hours, and the stand-by process is performed for four hours.

Moreover, the dehydration equipment 60 according to this embodiment includes a regenerative gas heater 70, a regenerative gas cooler 72, a regenerative gas knock-out drum 74, a regenerative gas preheater 76, and a regenerative gas compressor 78.

The regenerative gas heater 70 heats a portion of the $CO_2$ gas dehydrated in the adsorption tower 62 that is performing the adsorption process and supplies the $CO_2$ gas to the adsorption tower 62 that is performing the regeneration process. The regenerative gas heater 70 heats the $CO_2$ gas to a predetermined temperature (for example, 200° C. to 300° C.) with electric power or separately supplied steam.

The regenerative gas cooler 72 cools the $CO_2$ gas sent out from the adsorption tower 62 that is performing the regeneration process to a predetermined temperature (for example, 20° C. to 40° C.).

The regenerative gas knock-out drum 74 separates condensed water from the $CO_2$ gas cooled by the regenerative gas cooler 72 and returns the resulting $CO_2$ gas after separating water therefrom to the adsorption tower 62.

The regenerative gas preheater 76 performs heat exchange between the $CO_2$ gas that has been sent out from the adsorption tower 62 that is performing the regeneration process and will be supplied to the regenerative gas cooler 72 and the $CO_2$ gas that will be supplied to the regenerative gas heater 70.

The regenerative gas compressor 78 is provided between the regenerative gas knock-out drum 74 and the adsorption tower 62 and pressurizes the $CO_2$ gas used in the regeneration process so as to compensate for pressure loss caused by the regeneration process.

Next, the configuration of the $CO_2$ gas supply line 64 of the dehydration equipment 60 according to this embodiment will be described.

The supply line 64 connected to the outlet of the knock-out drum 54-3 is split. The split supply lines 64 have a valve 80A or 80B and are connected to the corresponding opening 66 in the adsorption tower 62A or 62B.

Furthermore, the split supply lines 64 are bypassed upstream of the connection to the corresponding adsorption towers 62A and 62B, and the bypassed supply lines 64 have a valve 80C or 80D. The valves 80C and 80D are connected by the supply line 64 that is connected to the regenerative gas cooler 72 via the regenerative gas preheater 76.

The supply lines 64 connected to the openings 68 in the adsorption towers 62A and 62B have a valve 80E or 80F, are joined downstream of the valves 80E and 80F, and are connected to the inlet of the compressor 50-3 via a filter 82. The filter 82 removes adsorbent powder from the $CO_2$ gas, if it is contained in the $CO_2$ gas.

Furthermore, the supply lines 64 connected to the openings 68 in the adsorption towers 62A and 62B are bypassed downstream of the valves 80E and 80F, and the bypassed supply lines 64 have a valve 80G or 80H. The valves 80G and 80H are connected by the supply line 64 that is connected to the outlet of the regenerative gas heater 70.

The joined supply line 64 that will be connected to the inlet of the compressor 50-3 is branched off at the outlet of the filter 82 and is connected to the inlet of the regenerative gas heater 70 via the regenerative gas preheater 76.

The regenerative gas cooler 72 is connected to the regenerative gas knock-out drum 74, the regenerative gas knock-out drum 74 is connected to the inlet of the regenerative gas compressor 78, and the outlet of the regenerative gas compressor 78 is connected to the supply line 64 that supplies the $CO_2$ gas from the knock-out drum 54-3 to the dehydration equipment 60.

Next, the operation of the dehydration equipment 60 according to this embodiment will be described.

In the description below, an exemplary case where the adsorption tower 62A performs the adsorption process and the adsorption tower 62B performs the regeneration process will be described.

In this case, the valves 80A and 80D are opened, and the valves 80B and 80C are closed. Furthermore, the valves 80E and 80H are opened, and the valves 80F and 80G are closed.

With this configuration, $CO_2$ gas containing water, supplied from the knock-out drum 54-3 to the dehydration equipment 60, is dehydrated in the adsorption tower 62A and is returned to the compressor 50-3. A portion (for example, 10% to 30%) of the dehydrated $CO_2$ gas (hereinbelow, "regenerative gas") is supplied to the regenerative gas heater 70 via the regenerative gas preheater 76. Upon completion of the regeneration process, the adsorption tower 62B performs the stand-by process to proceed to the adsorption process. The valve 80F is closed, so that $CO_2$ gas is not sent to the adsorption tower 62B that performs the stand-by process.

The regenerative gas supplied to the regenerative gas heater 70 is heated by the regenerative gas heater 70 and is supplied to the adsorption tower 62B that performs the regeneration process.

In the adsorption tower 62B, water adsorbed by the adsorbent is desorbed due to the heated regenerative gas. The desorbed water and the still hot regenerative gas are supplied to the regenerative gas preheater 76. The still hot regenerative gas supplied to the regenerative gas preheater 76 exchanges heat with the regenerative gas not yet heated by the regenerative gas heater 70 and is then supplied to the regenerative gas cooler 72.

As a result of heat exchange in the regenerative gas preheater 76, the temperature of the regenerative gas sent out from the adsorption tower 62B is decreased, whereas the temperature of the regenerative gas not yet heated by the generative gas heater 70 is increased.

With the regenerative gas preheater 76, the temperature of the regenerative gas supplied to the regenerative gas cooler 72 is decreased compared with that in the case without the regenerative gas preheater 76. Accordingly, the energy consumption by the regenerative gas cooler 72, i.e., the consumption of the cooling water supplied to the regenerative gas cooler 72, is reduced.

On the other hand, because the temperature of the regenerative gas not yet heated by the regenerative gas heater 70 is increased compared with that in the case without the regenerative gas preheater 76, the energy consumed by the regenerative gas heater 70 for heating the regenerative gas is reduced.

Furthermore, in the regeneration process, when the heated regenerative gas is supplied to the adsorption tower 62B, the adsorbent is gradually heated starting from a regenerative-gas supply side (i.e., the opening 68 side), desorbing water. The desorbed water and the regenerative gas move toward a regenerative-gas sending-out side (i.e., the opening 66 side) and are again adsorbed by the adsorbent on the sending-out side. That is, in the regeneration process, by alternately performing desorption and adsorption of water, water is desorbed starting from the adsorbent on the regenerative-gas supply side to the adsorbent on the sending-out side. Hence, the heated regenerative gas gives a larger amount of energy to the adsorbent immediately after the start of the regeneration process. Although the temperature of the regenerative gas sent out from the adsorption tower 62B that is performing the regeneration process is initially low, it increases with time.

For example, the temperature of the regenerative gas sent out from the adsorption tower 62B that is performing the regeneration process reaches, for example, approximately 150° C. within about 30 to 60 minutes from the start of the regeneration process. The temperature gradually increases after that, and at the end of the regeneration process, the regenerative gas reaches approximately 300° C., which is the temperature at which the regenerative gas is supplied to the adsorption tower 62B.

Because the temperature of the regenerative gas sent out from the opening 66 in the adsorption tower 62B changes with time during the regeneration process like this, the amount of heat exchange in the regenerative gas preheater 76 also changes. Thus, in order to heat the regenerative gas supplied to the adsorption tower 62B that is performing the regeneration process to a predetermined temperature (200 to 300° C.), the change in temperature needs to be compensated for by the regenerative gas heater 70, according to the change in the amount of heat exchange.

Hence, in this embodiment, the regenerative gas heater 70 controls the degree of heating of the regenerative gas according to the amount of heat exchange in the regenerative gas preheater 76.

More specifically, the temperature of the regenerative gas at the outlet or inlet of the regenerative gas heater 70 is measured with a thermometer 96A or a thermometer 96B, and the utility supplied to the regenerative gas heater 70 (steam consumption or power consumption) is adjusted according to the measured results.

Furthermore, by providing a plurality of regenerative gas preheaters 76 in the dehydration equipment 60, the amount of heat exchange can be further increased. In this embodiment, as an example, two regenerative gas preheaters, 76A and 76B, are connected in series. The regenerative gas sent out from the opening 66 in the adsorption tower 62B is made to sequentially pass through the regenerative gas preheater 76A and the regenerative gas preheater 76B, and the regenerative gas sent out from the opening 68 in the adsorption tower 62A is made to sequentially pass through the regenerative gas preheater 76B and the regenerative gas preheater 76A, thereby making them exchange heat.

This configuration enables more efficient heat exchange between the regenerative gas that has been sent out from the adsorption tower 62B that is performing the regeneration process but not yet been heated by the regenerative gas cooler 72 and the regenerative gas that has been sent out from the adsorption tower 62B.

The regenerative gas cooled by the regenerative gas cooler 72 is directed to the regenerative gas knock-out drum 74, where water in the regenerative gas is separated, and is then supplied to the regenerative gas compressor 78. The water separated in the regenerative gas knock-out drum 74 (condensed water) is discharged from the regenerative gas knock-out drum 74.

The regenerative gas compressor 78 pressurizes the supplied regenerative gas so as to compensate for pressure loss caused by the regeneration process and returns the regenerative gas to the supply line 64 connected to the opening 66 in the adsorption tower 62. With this configuration, the regenerative gas is pressurized by the regenerative gas compressor 78 to a pressure equal to the pressure of the regenerative gas supplied from the knock-out drum 54-3 to the dehydration n equipment 60, is mixed with the regenerative gas supplied from the knock-out drum 54-3 to the dehydration equipment 60, and is supplied to the adsorption tower 62. Thus, all the $CO_2$ gas sent out from the dehydration equipment 60 is further compressed by the compressor 50-3 provided in the subsequent stage of the compressor 50-2, which is the supply source of the $CO_2$ gas.

With this configuration, the regenerative gas used in the regeneration process is not returned to the inlet of the compressor 50-2 that has supplied the $CO_2$ gas, as in the case of the conventional apparatus, and thus, it is possible to solve the problem of increased motive power required by the compressor 50 to which the regenerative gas is returned.

Furthermore, the amount of $CO_2$ gas returned from the dehydration equipment 60 to the compressor 50 does not change at all even if the regenerative gas is not supplied to the adsorption tower 62B in the stand-by process. Thus, the operating conditions of the compressor 50 to which the $CO_2$ gas is returned do not change. Accordingly, it is possible to solve the problem that a change of the operating conditions due to a change in the amount of the regenerative gas returned to the compressor 50 affects the design of the $CO_2$ compression system 10.

Table 1 shows the difference in the power consumption between the conventional $CO_2$ compression system (see FIG. 3) and the $CO_2$ compression system 10 according to this embodiment.

TABLE 1

| utility | | regenerative gas preheater 76A regenerative gas preheater 76B regenerative gas compressor 78 | | |
|---|---|---|---|---|
| item | device/machine | yes | no | remark |
| BHP motive power | $CO_2$ compression system 10 | 17,400 kW | 17,950 kW | 2.5% reduction |
| | regenerative gas compressor 78 | 150 kW | — | |
| | total | 17,550 kW | 17,950 kW | |
| heat-exchanger heat duty | regenerative gas heater 70 | 0.82 MW | 2.52 MW | 65% reduction |
| | regenerative gas cooler 72 | 1.4 MW | 3.1 MW | 55% reduction |

As shown in Table 1, the power consumption (BHP motive power and heat-exchanger heat duty), i.e., the utility consumption, is smaller in the $CO_2$ compression system 10 according to this embodiment, which includes the regenerative gas preheaters 76A and 76B and the regenerative gas compressor 78, than in the conventional $CO_2$ compression system. Note that, because the conventional $CO_2$ compression system does not have the regenerative gas compressor 78, the $CO_2$ compression system 10 according to this embodiment has an increased BHP motive power of the regenerative gas compressor 78. However, because the BHP motive power of the regenerative gas compressor 78 is smaller than the BHP motive power reduced in the $CO_2$ compression system 10, the BHP motive power is reduced as a whole.

Furthermore, in the $CO_2$ compression system 10 according to this embodiment, the heat-exchanger heat duty of the regenerative gas heater 70 and the regenerative gas cooler 72 can also be reduced.

Furthermore, the compressors 50 of the $CO_2$ compression system 10 according to this embodiment consume less power than the compressors of the conventional $CO_2$ compression system.

This is because, in the conventional $CO_2$ compression system, the compressor to which the regenerative gas is returned (the compressor 202-2 in the example in FIG. 3) needs to have a larger capacity than the other compressors and needs to pressurize at a predetermined compression ratio, whereas in the $CO_2$ compression system 10 according to this embodiment, the need for a large-capacity compressor is eliminated by making the regenerative gas compressor 78, which has a small capacity, pressurize only the regenerative gas to compensate for only the pressure loss caused in the dehydration equipment 60. The regenerative gas compressor 78 pressurizes a small amount of gas at a fixed compression ratio, so it has a smaller capacity than the compressor 50 to which the regenerative gas is returned. Thus, the regenerative gas compressor 78 consumes less power than a large-capacity compressor.

As has been described above, the dehydration equipment 60 according to this embodiment includes a plurality of adsorption towers 62 that are provided in parallel in the $CO_2$ gas supply lines 64 and alternately perform the adsorption process, in which water contained in $CO_2$ gas is adsorbed, and the regeneration process, in which the adsorbed water is desorbed. The dehydration equipment 60 makes one adsorption tower 62 perform the adsorption process while making the other adsorption tower 62 perform the regeneration process.

The dehydration equipment 60 heats a portion of the $CO_2$ gas dehydrated in the adsorption tower 62 that is performing the adsorption process by the regenerative gas heater 70, supplies the $CO_2$ gas to the adsorption tower 62 that is performing the regeneration process, and makes the $CO_2$ gas that will be supplied to the regenerative gas heater 70 and the $CO_2$ gas sent out from the adsorption tower 62 that is performing the regeneration process exchange heat in the regenerative gas preheater 76. The dehydration equipment 60 cools, by the regenerative gas cooler 72, the $CO_2$ gas that has been sent out from the adsorption tower 62 that is performing the regeneration process and gone through the heat exchangers, separates condensed water from the cooled $CO_2$ gas by the regenerative gas knock-out drum 74, and returns the $CO_2$ gas to the adsorption tower 62 after separating the water.

Accordingly, the dehydration equipment 60 can prevent an increase in utility consumption due to the regeneration process.

Furthermore, the $CO_2$ compression system 10 according to this embodiment includes a plurality of compressors 50 that compress regenerative gas, and the dehydration equipment 60 according to this embodiment. The $CO_2$ gas compressed by a predetermined compressor 50 is dehydration by the dehydration equipment 60. The dehydrated $CO_2$ gas is further compressed by the compressor 50 provided in the subsequent stage of the predetermined compressor 50.

Although the present invention has been described using the above-described embodiment, the technical scope of the present invention is not limited to the scope of the description of the above-described embodiment. The above-described embodiment may be modified and improved in various ways within a scope not departing from the spirit of the invention, and modified or improved embodiments are also included in the technical scope of the present invention.

For example, although the gas dehydrated by the dehydration equipment 60 is $CO_2$ gas in the embodiment described above, the present invention is not limited thereto, and the gas dehydrated by the dehydration equipment 60 may be a gas other than $CO_2$ gas.

Furthermore, although the dehydration equipment 60 has two adsorption towers 62 in the embodiment described above, the present invention is not limited thereto, and the dehydration equipment 60 may have three or more adsorption towers 62.

Furthermore, although the dehydration equipment 60 is disposed in the middle of the compressors 50 in the embodiment described above, the present invention is not limited thereto, and the dehydration equipment 60 may be disposed downstream of the compressors 50.

REFERENCE SIGNS LIST

10 $CO_2$ compression system
50 compressor
60 dehydration equipment
62 adsorption tower
70 regenerative gas heater
72 regenerative gas cooler
74 regenerative gas knock-out drum
76 regenerative gas preheater

The invention claimed is:

1. A dehydration equipment in which a plurality of adsorption towers that alternately perform an adsorption process, in which water contained in gas is adsorbed, and a regeneration process, in which the adsorbed water is desorbed, are provided in parallel in a gas supply line and a predetermined adsorption tower performs the adsorption process while the other adsorption tower performs the regeneration process, the dehydration equipment comprising:
   a heating unit that heats a portion of the gas dehydrated in the adsorption tower that is performing the adsorption process and supplies the gas to the adsorption tower that is performing the regeneration process;
   a cooling unit that cools the gas sent out from the adsorption tower that is performing the regeneration process;
   a gas-liquid separating unit that separates condensed water from the gas cooled by the cooling unit and returns the resulting gas after separating water therefrom to the adsorption tower; and
   a preheating unit that performs heat exchange between the gas that has been sent out from the adsorption tower that is performing the regeneration process and will be supplied to the cooling unit and the gas that has been sent out from the adsorption tower that is performing the adsorption process and will be supplied to the heating unit;
   wherein, after completion of the regeneration process, the adsorption towers perform a stand-by process before proceeding to the adsorption process, and
   wherein the adsorption towers that are performing the stand-by process do not send out the gas.

2. The dehydration equipment according to claim 1, further comprising a compressor that is provided between the gas-liquid separating unit and the adsorption tower and pressurizes the gas used in the regeneration process so as to compensate for pressure loss caused in the regeneration process.

3. The dehydration equipment according to claim 1, wherein the preheating unit includes a plurality of preheating units.

4. A gas compression system comprising:
   a plurality of compressors that compress gas; and
   the dehydration equipment according to claim 1,
   wherein the gas compressed by a predetermined compressor is dehydrated by the dehydration equipment, and the dehydrated gas is further compressed by the compressor provided in the subsequent stage of the predetermined compressor.

5. A dehydration method providing a plurality of adsorption towers that alternately perform an adsorption process, in which water contained in gas is adsorbed, and a regeneration process, in which the adsorbed water is desorbed, in parallel in a gas supply line, wherein a predetermined adsorption tower performs the adsorption process while the other adsorption tower performs the regeneration process, the dehydration method comprising:
   heating a portion of the gas dehydrated in the adsorption tower that is performing the adsorption process with a heating unit and supplying the gas to the adsorption tower that is performing the regeneration process;
   performing heat exchange between the gas that has been sent out from the adsorption tower that is performing the adsorption process and will be supplied to the heating unit and the gas sent out from the adsorption tower that is performing the regeneration process with a preheating unit;
   cooling the gas sent out from the adsorption tower that is performing the regeneration process and exchanged heat in the preheating unit with a cooling unit; and
   separating condensed water from the gas cooled by the cooling unit and returning the resulting gas after separating water therefrom to the adsorption tower with a gas-liquid separating unit;
   wherein, after completion of the regeneration process, the adsorption towers perform a stand-by process before proceeding to the adsorption process, and
   wherein the adsorption towers that are performing the stand-by process do not send out the gas.

6. The dehydration equipment according to claim 1, wherein the heating unit is configured to control a degree of the heating of the gas according to the amount of heat exchange performed by the preheating unit.

7. The dehydration equipment according to claim 1, further comprising:
   a temperature detector that detects temperature of the gas at an inlet of the heating unit,
   wherein the heating unit is configured to control a degree of the heating of the gas according to the amount of heat exchange performed by the preheating unit, and
   wherein the amount of heat exchange is determined on the basis of the temperature detected by the temperature detector.

* * * * *